United States Patent [19]
Fetcenko et al.

[11] Patent Number: 4,948,423
[45] Date of Patent: Aug. 14, 1990

[54] ALLOY PREPARATION OF HYDROGEN STORAGE MATERIALS

[75] Inventors: Michael A. Fetcenko, Royal Oak; Steven P. Sumner; Joseph LaRocca, both of Warren, all of Mich.

[73] Assignee: Energy Conversion Devices, Inc., Troy, Mich.

[21] Appl. No.: 382,599

[22] Filed: Jul. 21, 1989

[51] Int. Cl.$^5$ ............................................... C21C 7/10
[52] U.S. Cl. .................................. 75/10.14; 75/10.18; 75/10.64; 420/900
[58] Field of Search ................... 75/10.14, 49, 10.18, 75/10.64; 420/900

[56] References Cited

U.S. PATENT DOCUMENTS

| | | | |
|---|---|---|---|
| 3,138,450 | 6/1964 | Figge | 75/10.14 |
| 4,584,015 | 4/1986 | Hartwig | 75/49 |
| 4,718,940 | 1/1988 | McPhillips | 75/49 |

Primary Examiner—Peter D. Rosenberg
Attorney, Agent, or Firm—Kenneth M. Massaroni; Marvin S. Siskind

[57] ABSTRACT

A method for the preparation of a highly alloyed metal hydride, hydrogen storage alloy material including titanium, zirconium, vanadium, nickel and chromium. The hydrogen storage alloy material is prepared by vacuum induction melting electrochemically operative amounts of the materials in a high density, high purity graphite crucible, under an inert gas atmosphere.

11 Claims, 1 Drawing Sheet

ALLOY PREPARATION OF HYDROGEN STORAGE MATERIALS

FIELD OF THE INVENTION

The present invention relates generally to the manufacture of hydrogen storage alloy material for use in rechargeable electrochemical cells. More particularly, the present invention relates to a method for the preparation of the highly alloyed metal hydride, hydrogen storage material for use in rechargeable electrochemical cells.

BACKGROUND OF THE INVENTION

Secondary cells using a rechargeable hydrogen storage negative electrode are known in the art. These cells operate in a different manner than lead-acid, nickel-cadmium or other prior art battery systems. The hydrogen storage electrochemical cell utilizes a negative electrode that is capable of reversibly electrochemically storing hydrogen. In one exemplification the cell employs a positive electrode of nickel hydroxide material, although other positive electrode materials may be used. The negative and positive electrodes are spaced apart in an alkaline electrolyte, and may include a suitable separator, spacer, or membrane therebetween.

Upon application of an electrical current to the negative electrode, the negative electrode material (M) is charged by the absorption of hydrogen:

$$M + H_2O + e^- \rightarrow M-H + OH^- \text{ (Charge)}$$

Upon discharge, the stored hydrogen is released to provide an electric current:

$$M-H + OH^- \rightarrow M + H_2O + e^- \text{ (Discharge)}$$

The reactions are reversible.

The reactions that take place at the positive electrode are also reversible. For example, the reactions at a conventional nickel hydroxide positive electrode as utilized in a hydrogen rechargeable secondary cell or battery are:

$$Ni(OH)_2 + OH^- \rightarrow NiOOH + H_2O + e^- \text{ (Charge), and}$$

$$NiOOH + H_2O + e^- \rightarrow Ni(OH)_2 + OH^- \text{ (Discharge).}$$

A cell utilizing a electrochemically rechargeable hydrogen storage negative electrode offers important advantages over conventional secondary batteries. Rechargeable hydrogen storage negative electrodes offer significantly higher specific charge capacities (ampere hours per unit mass and ampere hours per unit volume) than do either lead negative electrodes or cadmium negative electrodes. As a result of the higher specific charge capacities, a higher energy density (in watt hours per unit mass or watt hours per unit volume) is possible with hydrogen storage batteries than with the prior art conventional systems, making hydrogen storage cells particularly suitable for many commercial applications.

Suitable active materials for the negative electrode are disclosed in U.S. Pat. No. 4,551,400 to Sapru, Hong, Fetcenko and Venkatesan for HYDROGEN STORAGE MATERIALS AND METHODS OF SIZING AND PREPARING THE SAME FOR ELECTROCHEMICAL APPLICATION incorporated herein by reference. The materials described therein store hydrogen by reversibly forming hydrides. The materials of the '400 patent have compositions of:

$$(TiV_{2-x}Ni_x)_{1-y}M_y$$

where x is between 0.2 and 1.0, y is between 0.0 and 0.2 and M=Al or Zr;

$$Ti_{2-x}Zr_xV_{4-y}Ni_y$$

where x is between 0.0 and 1.5, and y is between 0.6 and 3.5; and $$Ti_{1-x}Cr_xV_{2-y}Ni_y$$

where x is between 0.0 and 0.75, and y is between 0.2 and 1.0.

Reference may be made to U.S. Pat. No. 4,551,400 for further descriptions of these materials and for methods of making same.

Other suitable materials for the negative electrode are disclosed in commonly assigned U.S. Pat. No. 4,728,586 issued Mar. 1, 1988 in the names of Srinivasen Venkatesan, Benjamin Reichman, and Michael A. Fetcenko for ENHANCED CHARGE RETENTION ELECTROCHEMICAL HYDROGEN STORAGE ALLOYS AND AN ENHANCED CHARGE RETENTION ELECTROCHEMICAL CELL; and U.S. Pat. No. 4,623,597, to Sapru, et al for RECHARGEABLE BATTERY AND ELECTRODE USED THEREIN, both of which are incorporated herein by reference. As described in the '586 patent, one class of particularly desirable hydrogen storage alloys comprises titanium, vanadium, nickel, and at least one metal chosen from the group consisting of aluminum, zirconium, and chromium. The preferred alloys described in the '586 patent are alloys of titanium, vanadium, nickel, zirconium, and chromium, especially alloys having the composition represented by the formula:

$$(Ti_{2-x}Zr_xV_{4-y}Ni_y)_{1-z}Cr_z$$

where x is between 0.0 and 1.5, y is between 0.6 and 3.5, and z is an effective amount less than 0.20.

The hydrogen storage alloy material may be formed by a number of different techniques such as from a high temperature melt, melt spinning or other metallurgical process. While a high temperature melt is preferred, different melting techniques may be employed with varying degrees of success. For example, early studies on hydrogen storage alloys were done using non-consumable arc melting apparatus. Arc melting techniques provide several advantages over other melt processes. These advantages include: (1) great versatility in terms of the types of materials which can be processed; (2) limited reactivity during melting; and (3) relatively low initial equipment costs for small scale arc melt systems. Unfortunately, as the size of the system required increases, equipment costs grow exponentially, until such a system becomes prohibitively expensive. Consequently, the economical size limitation of these types of apparatus is approximately 30 grams. Thus, this type of system is ideally suited for laboratory testing of sample and experimental materials; indeed most literature discussing hydrogen storage alloy materials makes reference to non-consumable arc melting apparatus for purposes of fabricating said materials.

While non-consumable arc melting possess the above described advantages in laboratory use, practically speaking it is almost impossible to scale-up for large scale production processes. This being the case, most researchers working in the metal hydride field have contemplated using consumable arc melting for scale-up production of metal hydride, hydrogen storage alloys. Consumable arc melting typically involves making a press powder compact of the raw materials into a rod shaped configuration. This compact rod is then consumed and melted by passing a high current arc into the end of the rod. Thus, an approximately ten foot long compacted rod having a diameter of approximately three inches is slowly passed through a chamber wherein the end of the rod is melted by an arc discharge and the melted material then drips, from the end of the rod, wherein melt is caught in a cooling vessel, solidifying into the final alloy ingot.

While consumable arc melting could be employed for use with hydrogen storage alloys such as those referred to hereinabove, it has several inherent disadvantages. Chief among these disadvantages is the inherent hazard present in the high current arc which is typically employed in such a manner so as to pass from the consumable cathode to a water cooled copper lined anode. This high current arc has been documented to have melted through the water cooled copper lining, thereby contacting the water and resulting in a rather violent reaction. While this is not a normal occurrence, it has been documented and has contributed to reduced acceptance of this type of technique. Other disadvantages associated with consumable arc melting include: (1) homogeneity, i.e., while this technique has been employed to alloy materials, it is typically not employed with alloys where a single component does not constitute at least 90 percent of the overall material. The hydrogen storage alloy materials discussed hereinabove are typically alloyed much more extensively. Indeed, the majority component in some of the metal hydride, hydrogen storage alloy materials discussed hereinabove can make up as little as 33 percent of the overall composition. Thus, it is likely that the final alloy prepared by consumable arc melting would have component gradients in composition, thus preventing commercial use; (2) preparation of the powder compact, i.e., in preparing the consumed rod employed in the consumable arc melting process, it is particularly important to make sure that uniformity in distribution of the raw materials be precisely controlled in order to achieve an compositionally homogenous final alloy. This is of course particularly important in situations wherein, as mentioned hereinabove, a very high degree of alloying is required. While precise processes for preparing the powder compact are well known, it is also well known that in order to prepare an adequate compact for a highly alloy material, it is impossible to use the most inexpensive forms of the raw materials to be alloyed, i.e., inexpensive (and plentiful) forms such as turnings and other irregularly shaped materials; and (3) process efficiency on the whole with this type of process tends to be very costly. A great deal of power extended to melt the raw materials is directed towards heating the water cooling medium rather than heating the raw materials. Additionally, the process has relatively low throughput and is fairly labor intensive. Further, the process is highly operator sensitive and therefore susceptible to the production of high quantities of scrap material, thereby significantly increasing the overall cost of the final alloy products.

The disadvantages inherent in the melt techniques discussed hereinabove are substantially overcome by the vacuum induction melting technique detailed hereinbelow. While this technique provides several advantages over prior art techniques, it also posed technical challenges to economical fabrication of hydrogen storage alloys. The most significant challenge posed was that of providing a crucible means in which to carry out the melt/alloy of the raw materials. Invariably, induction methods have failed because of the rapid, often violent reaction of one or more of the reactive component metals with the container or crucible used for the melt. Different types of crucible means have been suggested in conjunction with induction melting techniques. For example, U.S. Pat. No. 4,079,523 to Sandrock for "Iron, Titanium, Mishmetal Alloys for Hydrogen Storage" discusses a method for the preparation of an iron titanium mishmetal alloy which is used for hydrogen storage. Generally speaking, the Sandrock alloy is prepared by air melting an iron charge in a clay graphite crucible, thereafter a charge of titanium is added to the molten iron along with a deoxidizing mishmetal. While the Sandrock method may be successful for fabricating iron-titanium hydrogen storage alloys, the introduction of oxygen as by air into the metal hydride, hydrogen storage materials disclosed in, for example, Sapru, et al produces materials having inferior hydrogen storage capacity. Further, the clay-graphite crucible described in Sandrock cannot be employed in conjunction with the hydrogen storage materials disclosed hereinabove, which materials react with clay-graphite making containment difficult, (if not impossible), and preventing the crucible from being reused. Further, impurities are introduced into the final alloy.

The teaching of U.S. Pat. No. 2,548,897 to Kroll, et al is limited to the disclosure of a process for melting group IVa transition metals such as titanium, zirconium and hafnium in a graphite crucible. While this disclosure possesses some teaching which is relevant to the instant disclosure, it is important to note that the materials taught by, for example, Sapru, et al generally contain less than 30% combined titanium and zirconium. Therefore the teaching of Kroll, et al cannot be expanded to teach the invention disclosed herein. Further, Kroll, et al acknowledge the presence of carbon and carbides in the ingot of material which results from the melt process. It is noteworthy that in the metal hydride, hydrogen storage alloy materials discussed hereinabove, carbon and carbides therein are considered contaminants. These contaminants deleteriously effect the hydrogen storage capacity of the materials, and the performance parameters of said materials in electrochemical cells; therefore these contaminants are unacceptable for inclusion in metal hydride, hydrogen storage alloys, and must be minimized.

U.S. Pat. No. 3,529,958 to Buehler discloses a method of forming a titanium-nickel based alloy in a graphite crucible. While this reference has some teaching that may be of value to the method disclosed herein, it is to be noted that the Buehler reference requires that prior to the actual melt process, a pre-alloy process be conducted in order to coat the wall of the graphite crucible to prevent interaction thereof with the titanium-nickel alloy therewith. This pre-alloy process requires that a titanium-nickel starter plate be disposed in the bottom of the melting crucible in order to first melt, thereby preventing direct contact between the component metals and the crucible walls. The method disclosed herein does not require the use of a pre-alloy in order to prevent interaction of the component materials with the crucible. Further, the "TiNi base-type alloys" disclosed in the Buehler reference are specifically directed towards TiNi based alloys which further include Co and/or Fe.

Accordingly, it can be seen that there exists a need for an economical, safe method for the alloy fabrication of a highly alloyed, metal hydride, hydrogen storage alloy material.

SUMMARY OF THE INVENTION

Disclosed herein is a method for the vacuum induction melting preparation of highly alloyed hydrogen storage materials comprising a host matrix element selected from the group consisting of Mg, Ti, V, Zr, Nb, La, Si, Ca, Sc, Y, Ni, Co, Mo and combinations thereof and at least one modifier element selected from the group consisting of Cu, Mn, Fe, Ni, Al, Mo, W, Ti, Re, Co, Si, Ti, La, Ta, Ce, Zr, O, Cr, Nb, V, Su, Al, Ru and combinations thereof.

Particularly preferred hydrogen storage alloy materials having one of the following formulas:

$$(Ti_{2-x}Zr_xV_{4-y}Ni_y)_{1-z}Cr_z$$

wherein x is between 0.0 and 1.5, y is between 0.6 and 3.5, and z is an effective amount less than 0.20. The hydrogen storage alloy material may further include electrochemically operative amounts of Al, Fe, Si, Cu, Co, Mo, W and combinations thereof;

$$Ti_{2-x}Zr_xV_{4-y}Ni_y$$

wherein x is between 0.0 and 1.5, and y is between 0.6 and 3.5; and $$(TiV_{z-x}Ni_x)_{1-y}M_y$$

wherein x is between 0.2 and 1.0, y is between 0.0 and 0.2 and M is an element selected from Al, Zr and combinations thereof.

Other preferred hydrogen storage alloy materials employing the elements recited hereinabove, are disclosed in U.S. Pat. No. 4,637,967 to Keem, et al, and U.S. Pat. Nos. 4,487,818 to Ovshinsky, et al; 4,430,391 to Ovshinsky, et al; 4,545,883 to Ovshinsky, at al and 4,537,674 to Ovshinsky, et al the disclosure of which is incorporated herein by reference. Some other materials in this class include but are not limited to MgNiCu, TiNiCu, TiNiMg, MgFeAl, TiNi, NiMg, and VNi.

The alloy fabricated herein is adapted for use as the negative electrode material of rechargeable electrochemical metal hydride, hydrogen storage cells. The steps involved providing a high purity, high density graphite crucible; disposing electrochemically operative amounts of hydrogen storage alloy host matrix precursor elements and hydrogen storage alloy modifier precursor elements into said crucible; melting said precursor elements in an induction process; and cooling said materials in a graphite ingot mold. In one embodiment tailored to a material having the nominal composition $(Ti_{2-x}Zr_xV_{4-y}Ni_y)_{1-z}Cr_z)$ the steps involved in fabricating the highly alloyed metal hydride hydrogen storage material include for example: providing electrochemically operative amounts of zirconium, vanadium (or a vanadium:nickel alloy) nickel, chromium and titanium, in sequential or non-sequential order, in a high density, high purity graphite crucible; and melting the zirconium, vanadium, nickel, chromium and titanium disposed therein so as to form a molten zirconium:vanadium:nickel:chromium:titanium alloy. This is done so as to melt the added nickel, chromium and titanium thus forming a molten hydrogen storage alloy material. It is an advantage of the instant invention that various forms of raw material, i.e., vanadium may be used, and that the selection of such materials can be made on economic terms rather than technological terms.

Thereafter, the molten hydrogen storage alloy material is poured or emptied from the high density, high purity graphite crucible into a water cooled graphite ingot mold, wherein it is allowed to cool for approximately eight hours thus solidifying into a homogeneous, highly alloyed hydrogen storage material containing at least zirconium, vanadium, nickel, chromium, and titanium adapted for use as the negative electrode of electrochemical hydrogen storage cells.

The graphite crucible and mold station is operatively positioned inside a vacuum chamber so as to prevent exposure of the raw materials to air or other oxidizing agents. In order to further insure atmospheric integrity, the vacuum induction melting is carried out in an inert atmosphere. Specifically, the atmosphere is comprised of gasses selected from the group consisting essentially of argon, neon, helium and combinations thereof. Further, a reducing agent such as hydrogen may be added to the atmosphere.

DETAILED DESCRIPTION OF THE INVENTION

Figure 1:
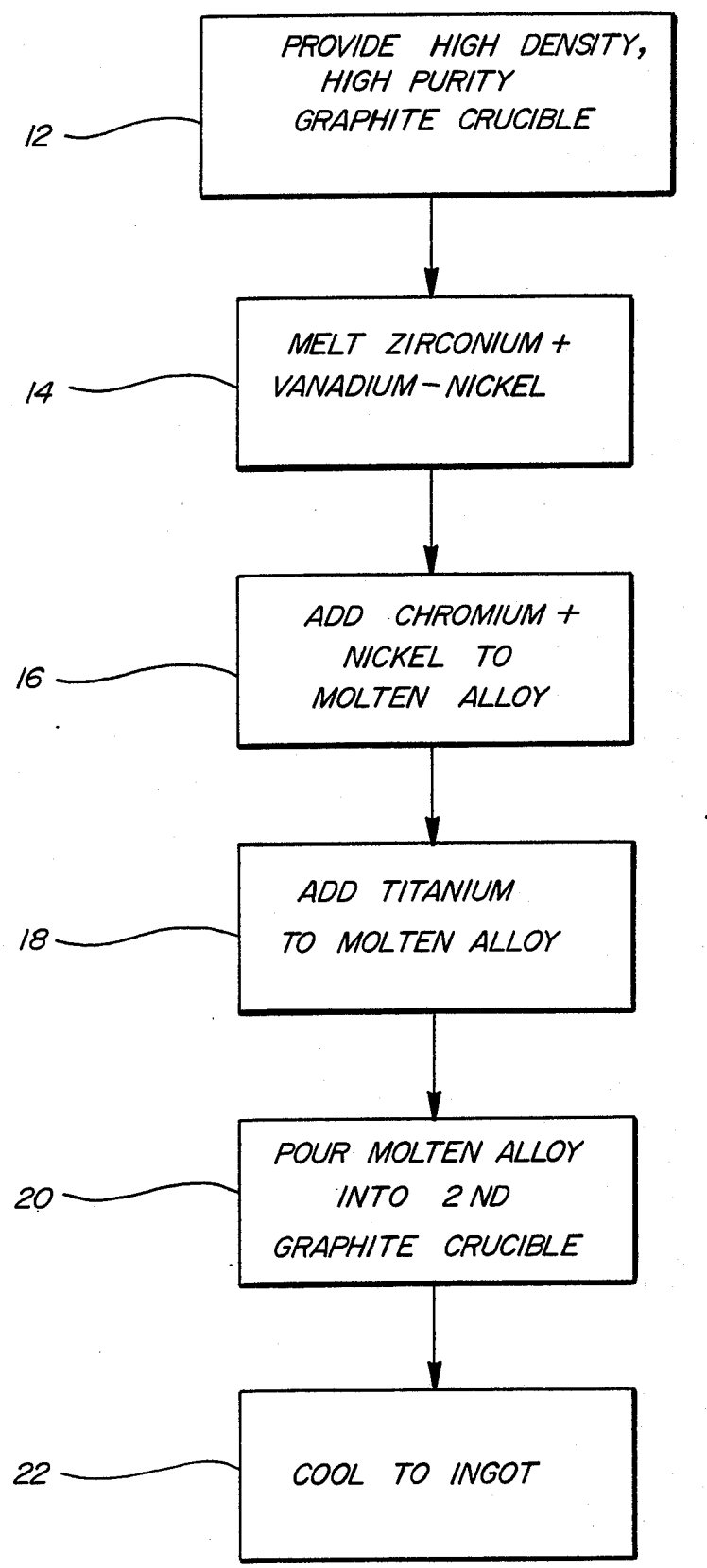
FIG. 1 is a block diagram illustrating the progression of steps necessary to effect the method of fabricating highly alloyed, metal hydride, hydrogen storage alloy material.

The instant invention is directed towards a method of fabricating, by alloy preparation, bulk metal hydride hydrogen storage alloy materials for use in, for example, the negative electrode of rechargeable electrochemical cells. The method disclosed herein has been developed so as to minimize the usual problems encountered in prior art techniques for fabrication of these types of materials. Specific problems, such as those enumerated hereinabove, include unwanted reactions during melting between the melting crucible and the precursor elements, safety, scale-up, process efficiency, contamination, and homogeneity. A key component to the utility of the particular process disclosed herein has been the discovery that the use of a very dense, high purity form of graphite for the fabrication of the melt crucible substantially eliminates reaction of the precursor materials therewith, without the need for pre-alloyed starter plates such as those shown in the Buehler reference. Although the high density, high purity graphite crucibles have been found to be quite expensive, reaction with the precursor materials is virtually non-existent; therefore each crucible may be repeatedly reused, thus making the cost of each crucible negligible.

As regards the need for highly alloyed homogeneity and process efficiency, it has been found that the induction melting technique disclosed herein is ideally suited for providing both desired characteristics. A feature of induction melting is a "stirring" which occurs due to strong magnetic fields within the induction coil. These strong fields induce movement of the molten materials through the crucible thus assuring a high degree of homogeneity of the highly alloyed material. Further, and of equal importance is the fact that reproducibility from sample-to-sample is extremely high. Also, due to stirring caused by the induction melting process, the role of the operator in assuring homogeneity and process efficiency is relatively low, thus minimizing scrap resulting from operator error. Since operator interaction is minimized, the likelihood of producing scrap or other unacceptable material is also minimized thus increasing process efficiency.

An induction molten process such as disclosed herein is also very useful from the standpoint of scaling up for economical use in large scale commercial applications. The process examples disclosed herein are capable of handling approximately 65 Kg (143 pound) batches of raw materials. Larger systems can be easily manufactured involving relatively simple engineering problems. Further, larger systems in fact are very cost effective from the standpoint of energy usage and labor. For example, the furnace used in the system disclosed herein is designed with approximately 95 percent efficiency in terms of applied power to the actual melt. Additionally, the stirring action provided by the induction melting coil allows the most inexpensive forms of the raw materials, i.e., scrap to be used. Thus, rather than using expensive sponge type forms of the raw materials, the instant system allows the use of very diverse and inexpensive of forms of raw materials such as shot, chips turnings and powders. This allows great flexibility in terms of purchasing and providing the raw materials needed and hence lowering the overall production costs. Further, very inexpensive forms of V, such as V-Ni, V-Ni-Al, V-Al and combinations thereof which may have undergone electron beam refinement as disclosed in concurrently filed patent application Ser. No. 383,693 may be employed in the instant method.

The instant method can be advantageously employed for the fabrication of many different types of bulk hydrogen storage alloy materials. Hydrogen storage alloys contemplated by the instant method include hydrogen storage alloys having a host matrix selected from one or more elements of the group consisting of Mg, Ti, V, Zr, Nb, La, Si, Ca, Sc, Y, Ni, Co, Mo and combinations thereof; and one or more modifier elements selected from the group consisting of Cu, Mn, Fe, Ni, Al, Mo, W, Ti, Re, Co, Si, La, Ta, Ce, Zn, Zr, O, Cr, Nb, V, Sr, Co, Al, C, Ru and combinations thereof, such as the materials disclosed in U.S. Pat. No. 4,623,579 to Sapru, et al.

Specific examples include hydrogen storage materials with the following formulas:

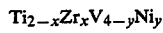

where x is between 0.0 and 1.5, and y is between 0.6 and 3.5;

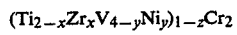

where x is between 0.0 and 1.5, y is between 0.6 and 3.5 and Z is an effective amount less than 0.20; and

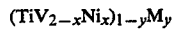

wherein x is between 0.2 and 1.0, y is between 0.0 and 0.2 and M is an element selected from Al, Zr and combinations thereof.

Referring now to FIG. 1, there is illustrated therein a block diagram, or flow chart 10 generally depicting one example of the possible sequence of steps to be followed when fabricating highly alloyed, metal hydride, hydrogen storage alloy material having the general formula $(Ti_{2-x}Zr_{4-y}V_{4-y}Ni_y)_{1-z}Cr_z$. This method is described in detail in one of the examples which follows hereinbelow. It is important to note that the Ti-Zr-V-Ni-Cr system illustrated is but one hydrogen storage alloy which can be fabricated by the instant method, and that while the precursor elements may be changed, the general steps may be followed.

The first step illustrated in chart 10, and described in block 12 is that of providing a high density, high purity graphite crucible. As discussed hereinabove, the inventors have found that a crucible of this type possesses characteristics which substantially eliminate reaction thereof with the raw materials used in the fabrication of hydrogen storage alloys. Further, this type of crucible can easily withstand the elevated temperatures employed in alloying said raw materials. The graphite material from which the crucible is fabricated is critical since impurities in the graphite could react with constituent elements in the hydrogen storage alloy. Further, porosity of the graphite should be low such that penetration is eliminated (penetration of metal raw materials into the graphite and subsequent expansion and contraction of the metal during heating/cooling cycles, may cause erosion of the graphite and hence deterioration of the crucible). Additionally, the graphite should be machinable, and have a small grain size, and low ash content. Specific preferred graphite properties include a bulk density of at least 1.77 Mg/m$^3$ (110 lbs/ft$^3$), porosity of less than 17%, and material purity of at least 99.8%.

Block 14 of FIG. 1 specifies the second step of the method disclosed herein. The second step involves providing electrochemically operative amounts of zirconium and vanadium, or a vanadium:nickel alloy. These materials are then placed into the high density, high purity graphite melting crucible, which is itself disposed within a high temperature autoclave, to allow for the melting of the materials.

The autoclave is a high temperature vacuum induction furnace for melting of materials. The vacuum induction furnace further allows for melting to be carried out in an inert atmosphere such as argon, neon, helium and combination thereof. Once the molten alloy of zirconium:vanadium:nickel is formed, electrochemically operative amounts of chromium and nickel are added thereto by means of a loading chute in the autoclave. Said chute allows for loading of additional materials into the crucible within the autoclave without exposing the molten alloy therewithin to ambient conditions. The step of adding chromium and nickel to the molten zirconium:vanadium:nickel alloy is illustrated in block 16 of FIG. 1. Again, it is necessary to note that the specific sequence of steps regarding the addition of materials to the crucible is not critical; rather, it is related to the physical form of particular elements.

Upon further heating within the autoclave, a molten zirconium:vanadium:nickel:chromium alloy is formed within the graphite crucible. As illustrated in block 18 of FIG. 1, electrochemically operative amounts of titanium are then added to the molten alloy. This is allowed to melt in the crucible along with the molten alloy already present therewithin to form a molten zirconium:vanadium:nickel:chromium:titanium hydrogen storage alloy having the nominal composition;

$$(Ti_{2-x}Zr_xV_{4-y}Ni_y)_{1-z}Cr_z$$

where x is between 0.0 and 1.5, y is between 0.6 and 3.5, and z is an effective amount less than 0.20, as discussed above, and as will be detailed below in the following examples, many other bulk hydrogen storage alloy materials can be fabricated according to the principles of the instant method. The ability to add extra material to the melt is an additional benefit which is made possible by the instant method. The least expensive forms of the precursor raw materials frequently have various shapes and sizes. Consequently, the initial packing density of such materials may be low. However, once the materials have been melted, and density increases, it is possible to add more material to the crucible, thereby improving process througput and overall efficiency. The provision of additional material is completely flexible, and can be easily achieved via the use of a vacuum load lock mechanism.

A further advantageous feature of the instant method is that the melt process can be thought of as an alloy refining process. This feature is due to the fact that during melting, an impurity slag forms atop the molten alloy. More specifically, this slag serves to collect oxides and other contaminates in the hydrogen storage alloy, which contaminants would otherwise form "inclusion" which diminish sites for hydrogen storage. The origin of these contaminants is typically the raw materials since economical forms of the contemplated elements frequently contain minor impurities. The slag floats upon the molten alloy, and remains in the crucible after pouring and is thereafter easily removed upon solidification. Thus, this feature of the instant invention yields alloys having exceptionally good properties, even though commercial raw materials are used.

Proceeding to block 20, illustrated therein is the step of pouring the molten alloy material from the melting crucible into a second, high density, high purity graphite crucible adapted to allow for cooling the molten alloy. This crucible, like the first crucible is ideal for this function since the graphite resists reaction with the molten alloys therewithin, minimizing impurities and inclusions in the alloy, and further allowing for the reuse of the ingot mold.

The final step in the alloy preparation of hydrogen storage alloy materials is shown in block 22 of FIG. 1. Specifically, the hydrogen storage alloy material is allowed to cool to a solid ingot form in the graphite cooling crucible. It is important to note that varying the cooling rate will allow for modification of the microstructure of the material. The cooling rate can be varied by controlling the water cooling of the graphite ingot mold. Indeed, the cooling rate can easily be varied from a matter of minutes to perhaps days. Thereafter, the ingot can be removed and subjected to subsequent processing steps such as comminution to a desired size and shape for the pressing of said materials into the negative electrode of rechargeable, electrochemical hydrogen storage cells.

Of course the method illustrated in FIG. 1 can be applied to the bulk fabrication of all types of hydrogen storage alloy materials. More specifically, the fabrication method for most types of hydrogen storage alloys would involve providing the high density, high purity graphite crucible described hereinabove; disposing electrochemically operative amounts of precursor materials thereinto; melting the materials, in the process forming a contaminant collecting slag; and pouring the molten alloy into a water cooled, high purity, high density graphite ingot mold. As discussed hereinabove, the importance of the graphite crucible and ingot mold cannot be underestimated.

The instant invention can be best understood through the examples presented hereinbelow.

EXAMPLES

Samples of the metal hydride hydrogen storage alloy material were prepared by the method generally described hereinabove. Specific examples of the preparation of said materials are described in detail hereinbelow.

EXAMPLE I

Each of the raw materials necessary for the fabrication of the metal hydride negative electrode material was carefully weight to within + or −0.05 kilograms. Each component was weight out in the following proportions.

| | |
|---|---|
| NICKEL SHOT | 8.41 KG |
| VANADIUM-NICKEL | 8.55 KG |
| CHROMIUM | 1.68 KG |
| TITANIUM | 3.92 KG |
| ZIRCONIUM | 7.45 KG |
| TOTAL | 30.00 KG |

The zirconium and vanadium-nickel was placed into the melting crucible, filling it approximately to the top. As disclosed hereinabove, the melting crucible was a high density, high purity graphite crucible fabricated from graphite such as that provided by Stackpole Inc., Carbon Division, Graphite Grade 2020; or Union Carbide Corporation, Carbon Products Division, GRAPHI-TOOL ™ Graphite Materials.

The vanadium-nickel, which was first separated into two grades, fine powder and coarse rocks, was placed into the graphite crucible. Loose zirconium was prepared by pressing said material into a six inch diameter by six inch high pellet. This zirconium pellet represents approximately 60 percent of the total amount of zirconium used herein. The remaining 40 percent was loaded in loose form, i.e., powder in the melting crucible. The zirconium pellet was first loaded into the crucible along with the vanadium nickel material, which vanadium nickel was placed around the zirconium pellet. Some of the loose, powdered zirconium was also mixed with the vanadium nickel and pressed around the pellet. Additional pellets of zirconium may be stacked atop the initial zirconium pellet in order to completely fill the high density, high purity graphite crucible.

The course of vanadium nickel was disposed so as to fill the graphite crucible to the the rim. The vanadium nickel remained loosely packed to insure that bridging did not occur during the initial melt. A small amount of titanium was used to block the front of the crucible so that a slight tilt was applied thereto so that bridging did not occur during the initial melt procedure.

Thereafter, approximately four cups of nickel shot was mixed with approximately two cups of chromium. The nickel, chromium mixture was then placed into an addition/loading chamber. The top of the loading chamber was made secure so that an argon blanket could be disposed thereover. Thereafter, the furnace was sealed and evacuated to a pressure of less than about 200 microns and backfilled with argon to a pressure of about 100 microns. This procedure was repeated three times. After the third evacuation, the background pressure of the furnace was less than 50 microns. A pre-heat regimen was then started so as to begin to cycle the furnace to the appropriate temperature in order to thoroughly melt the material disposed in the graphite crucible therewithin. After having appropriately evacuated the chamber, power was applied to the furnace so as to begin heating it to the desired temperature. It is noteworthy to point out that measurements were taken approximately every 10 minutes to determine the atmosphere inside of the chamber. After approximately 30 minutes, the chamber background pressure had risen to approximately 150 microns. Thus after the pre-heat was completed, the chamber was re-evacuated to a background pressure of about 50 microns.

At the beginning of the heating process, the power applied, to the vacuum induction melt furnace was ramped up from 25 kilowatts applied power to approximately 55 kilowatts applied power. After achieving 55 kilowatts of power during the first approximately 25 minutes, the chamber was allowed to idle at approximately 55 kilowatts for about 10 minutes, at which time a portion of the nickel, chromium mixture in the addition/loading chamber was added. After having added the nickel and chromium, the power level was allowed to remain at 55 kilowatts for about 5 to 10 minutes at which time the remainder of the nickel, chromium mixture was added. After having added the nickel and chromium, the addition chamber was resealed and brought back to atmospheric pressure so as to open it to ambient conditions from the outside of the furnace. Into the inside of the addition chamber was added approximately six cups of titanium which was packed firmly into the interior of the addition chamber. Thereafter, the addition chamber was resealed and a vacuum level established which is substantially identical to that within the furnace, i.e., approximately 50 microns. The titanium was added to the melt within the furnace approximately 5 to 10 minutes after the addition of the nickel, chromium mixture. The furnace is allowed to continue at approximately 55 kilowatts of power for 10 minutes as the addition chamber is reloaded using the above described procedure with the remaining titanium. Which titanium was added to the melt approximately 10 minutes after the second reload.

Thereafter, applied power was ramped up from 55 kilowatts to approximately 75 kilowatts during the course of approximately 10 minutes. The temperature at this point was generally between 1300° and 1400° Celsius. The power level was set at 75 kilowatts for about 15 minutes. During this time a white slag film was observed, although it was further observed to dissipate during this 10 minute span. The 10 to 15 minutes at 75 kilowatts increased the temperature of the melt to approximately 1600° Celsius. Thereafter, approximately 85 kilowatts of power was applied to the furnace taking the temperature of the melt to approximately 1800° C. This power level was maintained for approximately 10 minutes after which the applied power was reduced to 40 kilowatts so as to maintain a temperature of approximately 1750° Centigrade. As the temperature cooled down to below approximately 1750°, the white slag film was observed reforming. This typically has been observed to take about 10 minutes. After the film has formed covering the entire surface of the melt, approximately two minutes time was allowed after which the operator of the chamber turned off the power applied to the furnace. Thereafter, a small amount of the melted alloy material was poured off from the crucible and into a water cooled, second high density, high purity, graphite crucible. This initial pouring is adapted to coat the interior of the cooling crucible. After having poured off the initial amount of the melt, and having waited for approximately one to two minutes, the remainder of the melt is poured from the furnace, into the water cooled graphite crucible. It has been observed that it will take approximately four hours for the melt to solidify in the water cooled graphite cooling crucible. After allowing to be cooled, the ingot so formed is ready for a hydriding comminution as described in the hereinabove mention patent applications.

EXAMPLE II

Employing the fabrication steps enumerated hereinabove with regard to Example I, a metal hydride, hydrogen storage alloy material having the nominal composition $V_{53}$, $Ti_{17}$ $Cr_{16}$ $Ni_{14}$ was fabricated. The raw materials necessary for fabricating such material were carefully weighed out to within plus or minus 0.05 kilograms. Each component was weighed out in the following proportions.

| | |
|---|---|
| Vanadium Turnings | 6.785 KG |
| Vanadium-Nickel | 13.563 KG |
| Titanium | 4.623 KG |
| Chromium | 5.016 KG |
| TOTAL | 30.00 KG |

As in Example I, vanadium nickel and vanadium turnings were placed into the melting crucible, filling said crucible to approximately the top. The melting crucible was of course the high density, high purity graphite crucible fabricated from the types of graphite enumerated hereinabove. Said materials and crucible were placed inside the furnace, which was made secure so that an argon blanket could be disposed thereover. Thereafter, the sealed furnace was evacuated to pressure of less then about 200 microns and backfilled with argon to a pressure of about 100 microns. This procedure was repeated three times. After a period of evacuation, the background pressure of the furnace was less then 50 microns.

A pre-heat regimen was then started so as to begin to cycle the furnace to the appropriate temperature in order to thoroughly melt the raw materials disposed in the graphite crucible therewithin. After having appropriately evacuated the furnace, power was applied to the furnace so as to begin heating it to the desired temperature. It is noteworthy to point out that the measurements were taken approximately every 10 minutes to determine the atmosphere inside the chamber. After approximately 30 minutes, the chamber background pressure had risen to approximately 150 microns. Thus, after the pre-heat regime was completed the chamber was re-evacuated to a background pressure of about 50 microns.

Thereafter, the power applied to the furnace was ramped from approximately 25 kilowatts up to approximately 55 kilowatts of power over approximately 25 minutes, after which time the chamber was left to idle at approximately 55 kilowatts for about 10 minutes. Thereafter, the titanium and chromium was allowed to be added to the graphite crucible containing the now molten vanadium turnings and vanadium nickel material. Of course, the titanium and chromium was added by means of the vacuum load lock apparatus described hereinabove. After having the added titanium and chromium, the power level was allowed to remain at 55 kilowatts for about 5 to 10 minutes. After having added the titanium and chromium, the addition chamber was resealed and brought back to atmospheric pressure so as to open the load lock chamber to ambient conditions outside the furnace.

Thereafter, the applied power was ramped up from 55 kilowatts to approximately 75 kilowatts during the course of approximately 10 minutes. The temperature at this point was generally between 1300° and 1400° C. The applied power was left at 75 kilowatts for about 15 minutes time. During this time period a white slag film was observed, although it was further observed at this film dissipated towards the end of the 10 minute span. The 10 to 15 minutes at 75 kilowatts increased the temperature melt to approximately 1600° C. Thereafter, approximately 85 kilowatts of power was applied to the furnace taking the temperature of the melt to approximately 1800° C. This power level was maintained for approximately 10 minutes after which the applied power was reduced to 40 kilowatts so as to maintain the temperature at approximately 1750° C. As the temperature cooled down to below approximately 1750° C., the white slag film was observed reforming. After the film was formed covering the entire surface of the melt, approximately two minutes time was allowed after which the operator of the furnace turned off the power applied thereto. Thereafter, a small amount of the melt was poured off into the water cooled, second, high density, high purity, graphite crucible. This initial pouring is adapted to coat the interior of the cooling crucible. After having poured off the initial amount of the melt, and having waited for approximately one to two minutes, the remainder of the melt is poured from the furnace into the water cooled graphite crucible.

EXAMPLE III

Employing the fabrication steps enumerated hereinabove with regard to Examples I and II, a metal hydride, hydrogen storage alloy materials having the nominal composition $V_{51}Ti_{16}Cr_{15}Ni_{13}Al_5$ was fabricated. The raw materials necessary for fabricating such material were carefully weighed out to within plus or minus 0.05 kilograms. Each component was weighed out in the following properties.

| | |
|---|---|
| Vanadium-Nickel | 6.10 Kg |
| Vanadium-Aluminum | 4.25 Kg |
| Vanadium | 3.74 Kg |
| Nickel | 1.27 Kg |
| Titanium | 3.53 Kg |
| Chromium | 3.84 Kg |
| | 22.73 Kg |

Vanadium nickel and vanadium aluminum were placed into the melting crucible, filling said crucible to approximately the top. The melting crucible was of course the high density, high purity graphite crucible fabricated from the types of graphite enumerated hereinabove. Said materials and crucible were placed inside the furnace, which was made secure so that an argon blanket could be disposed thereover. Thereafter, the sealed furnace was evacuated to pressure of less then about 200 microns and backfilled with argon to a pressure of about 100 microns. This procedure was repeated three times. After a period of evacuation, the background pressure of the furnace was less then 50 microns.

A pre-heat regimen was then started so as to begin to cycle the furnace to the appropriate temperature in order to thoroughly melt the raw materials disposed in the graphite crucible therewithin. After having appropriately evacuated the furnace, power was applied to the furnace so as to begin heating it to the desired temperature. It is noteworthy to point out that the measurements were taken approximately every 10 minutes to determine the atmosphere inside the chamber. After approximately 30 minutes, the chamber background pressure had risen to approximately 150 microns. Thus, after the pre-heat regime was completed the chamber was re-evacuated to a background pressure of about 50 microns.

Thereafter, the power applied to the furnace was ramped from approximately 25 kilowatts up to approximately 55 kilowatts of power over approximately 25 minutes, after which time the chamber was left to idle at approximately 55 kilowatts for about 10 minutes. Thereafter, the titanium and chromium was allowed to be added to the graphite crucible containing the now molten vanadium turnings and vanadium nickel material. Of course, the titanium and chromium was added by means of the vacuum load lock apparatus described hereinabove. After having the added titanium and chromium, the power level was allowed to remain at 55 kilowatts for about 5 to 10 minutes. After having added the titanium and chromium, the addition chamber was resealed and brought back to atmospheric pressure so as to open the load lock chamber to ambient conditions outside the furnace.

Thereafter, the applied power was ramped up from 55 kilowatts to approximately 75 kilowatts during the course of approximately 10 minutes. The temperature at this point was generally between 1300° and 1400° C. The applied power was left at 75 kilowatts for about 15 minutes time. During this time period a white slag film was observed, although it was further observed at this film dissipated towards the end of the 10 minute span. The 10 to 15 minutes at 75 kilowatts increased the temperature melt to approximately 1600° C. Thereafter, approximately 85 kilowatts of power was applied to the furnace taking the temperature of the melt to approximately 1800° C. This power level was maintained for approximately 10 minutes after which the applied power was reduced to 40 kilowatts so as to maintain the temperature at approximately 1750° C. As the temperature cooled down to below approximately 1750° C., the white slag film was observed reforming. After the film was formed covering the entire surface of the melt, approximately two minutes time was allowed after which the operator of the furnace turned off the power applied thereto. Thereafter, a small amount of the melt was poured off into the water cooled, second, high density, high purity, graphite crucible. This initial pouring is adapted to coat the interior of the cooling crucible. After having poured off the initial amount of the melt, and having waited for approximately one to two minutes, the remainder of the melt is poured from the furnace into the water cooled graphite crucible.

It is to be noted that the instant invention is to be defined solely by the scope of the claims appended hereto and that any limitations set forth in the specification or drawings are present for purposes of clarity and not for purposes of narrowing the scope of those claims.

We claim:

1. A method for the vacuum induction melting preparation of a multi-component, highly alloyed hydrogen storage material comprising at least titanium, zirconium, vanadium, nickel, chromium and at least one modifier element selected from the group consisting of manganese, aluminum, molybdenum, copper, tungsten, iron, silicon, tin, zinc and combinations thereof, said alloy being adapted for use as the negative electrode material of rechargeable electrochemical, hydrogen storage cells, said method comprising the steps of:
   (a) providing a high density, high purity graphite crucible;
   (b) providing electrochemically operative amounts of zirconium and vanadium-nickel alloy in said high density, high purity graphite crucible;
   (c) vacuum induction melting said zirconium and said vanadium-nickel alloy in said graphite crucible;
   (d) adding electrochemically operative amounts of nickel, chromium, titanium and modifier element to the molten zirconium-vanadium-nickel alloy, while heating said molten zirconium-vanadium-nickel alloy to a temperature sufficient to melt said nickel, chromium, titanium and modifier to form a molten hydrogen storage alloy material; and
   (e) pouring said molten hydrogen storage alloy material from said high density, high purity graphite crucible into a water cooled graphite ingot mold.

2. A method as in claim 1, wherein said graphite crucible is operatively positioned inside a vacuum induction furnace.

3. A method as in claim 1, wherein said high density, high purity graphite crucible has a bulk density of at least 1.77 Mg/m$^3$.

4. A method as in claim 3, wherein said high density, high purity graphite crucible has a total porosity of less than 17%.

5. A method as in claim 1, wherein said high density, high purity graphite crucible is at least 99.8% pure.

6. A method as in claim 1, wherein the step of melting said precursor elements comprises the further steps of applying an induction melting process of at least 400 V, 3000 Hz and 100 KW power, for a charge size of 65 Kg.

7. A method as in claim 1, wherein said induction melting is carried out in an inert atmosphere.

8. A method as in claim 7, wherein said inert atmosphere is provided by a gas selected from the group consisting of argon, neon, helium and combinations thereof.

9. A method as in claim 8, wherein said inert atmosphere may contain operative amounts of a reducing agent.

10. A method as in claim 9, wherein said reducing agent is hydrogen.

11. A method as in claim 1, wherein the step of melting said precursor elements includes the further step of forming an alloy refining slag for removing contaminate from said precursor elements.

* * * * *